United States Patent [19]
Huber

[11] Patent Number: 5,187,760
[45] Date of Patent: Feb. 16, 1993

[54] WAVELENGTH SELECTIVE COUPLER FOR HIGH POWER OPTICAL COMMUNICATIONS

[75] Inventor: David R. Huber, Warrington, Pa.

[73] Assignee: General Instrument Corporation, Hatboro, Pa.

[21] Appl. No.: 822,582

[22] Filed: Jan. 23, 1992

[51] Int. Cl.[5] .............................................. G02B 5/18
[52] U.S. Cl. .......................................... 385/37; 372/6
[58] Field of Search ................................. 385/27-37; 372/6

[56] References Cited

U.S. PATENT DOCUMENTS

| | | | |
|---|---|---|---|
| 3,902,133 | 8/1975 | Watts | 385/30 X |
| 3,912,363 | 10/1975 | Hammer | 385/37 X |
| 4,018,506 | 4/1977 | Hammer | 385/30 X |
| 4,589,118 | 5/1986 | Suzuki et al. | 372/71 |
| 4,829,529 | 5/1989 | Kafka | 385/127 X |
| 4,852,960 | 8/1989 | Alferness et al. | 385/27 X |
| 4,938,561 | 7/1990 | Grasso et al. | 372/6 X |
| 5,008,887 | 4/1991 | Kafka et al. | 372/18 X |
| 5,058,977 | 10/1991 | Sorin | 385/30 |

OTHER PUBLICATIONS

E. Snitzer, et al, "Active Fiber Research Highlights," Rutgers University, Oct. 30, 1991.

Primary Examiner—Akm E. Ullah
Attorney, Agent, or Firm—Barry R. Lipsitz

[57] ABSTRACT

A wavelength selective optical fiber coupler having various applications in the field of optical communications is disclosed. The coupler includes a first substrate that has an optical input end for receiving a first optical signal. A first grating is formed in the first substrate. A second substrate has an optical input end for receiving a second optical signal. A second grating is formed in the second substrate. The first and second gratings are joined to transfer energy from the second optical signal to the first substrate for combination with the first optical signal. The combined signals are output from an optical output end of the first substrate. The gratings can comprise, for example, in-fiber gratings. Alternatively, at least one of the gratings can be provided in a polished optical block. The coupler can be used to combine a plurality of pump lasers operating at slightly different wavelengths, for input to an optical fiber amplifier having a broad pump band. A specific embodiment of a high power optical fiber amplifier using a neodymium fiber pump laser is also disclosed.

20 Claims, 3 Drawing Sheets

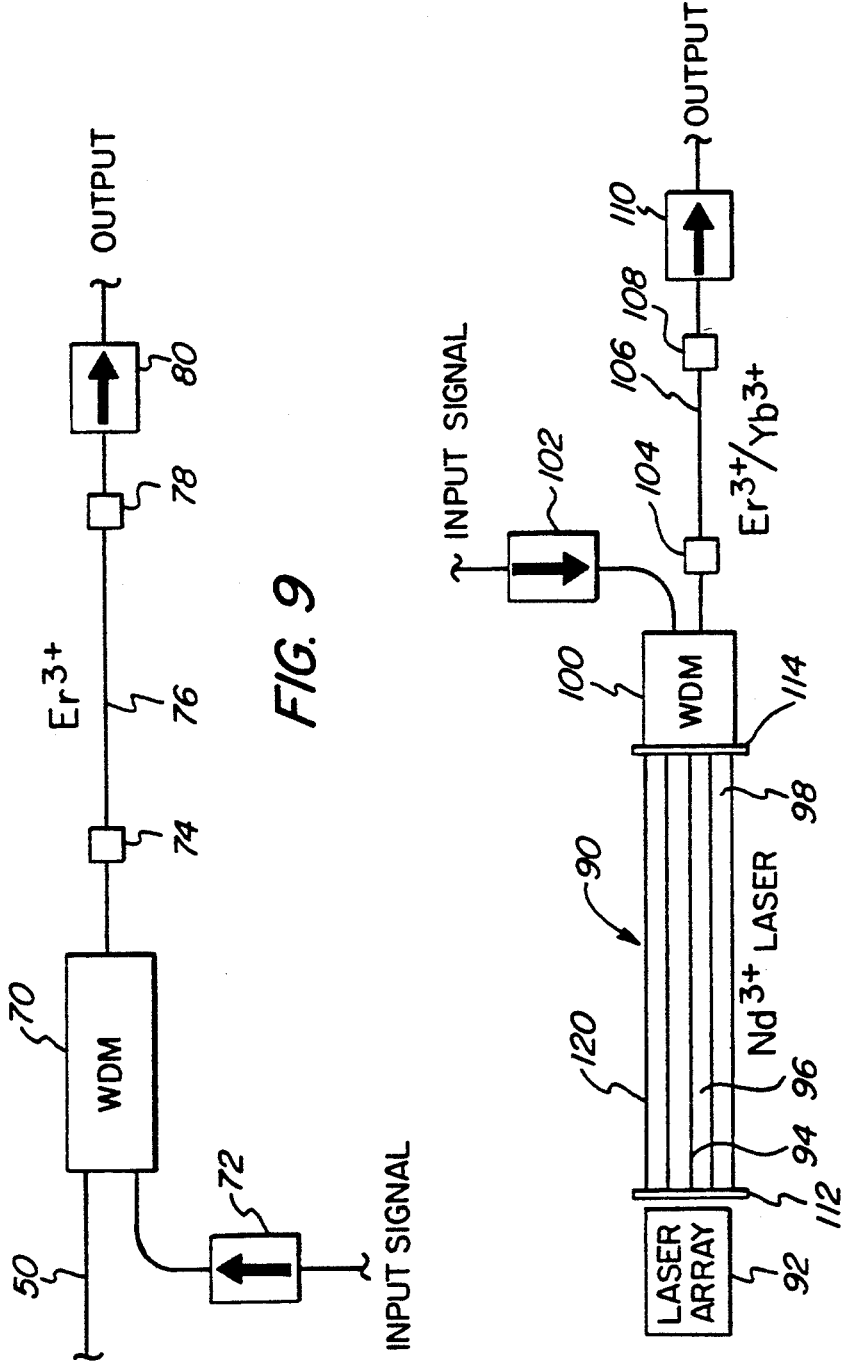

WAVELENGTH SELECTIVE COUPLER FOR HIGH POWER OPTICAL COMMUNICATIONS

BACKGROUND OF THE INVENTION

The present invention relates to the communication of signals via optical fibers, and more particularly to a wavelength selective optical coupler that is useful in combining a plurality of optical signals for communication via a common transmission path and in providing a high power optical fiber amplifier.

Cable television systems currently distribute television program signals via coaxial cable, typically arranged in tree and branch networks. Coaxial cable distribution systems require a large number of high bandwidth electrical amplifiers. For example, forty or so amplifiers may be required between the cable system headend and an individual subscriber's home.

The use of a television signal comprising amplitude modulated vestigial sideband video subcarriers (AM-VSB) is preferred in the distribution of cable television signals due to the compatibility of that format with the standards of the National Television Systems Committee (NTSC) and the ability to provide an increased number of channels within a given bandwidth. An undesirable characteristic of AM-VSB transmission, however, is that it requires a much higher carrier-to-noise ratio (CNR) than other techniques, such as frequency modulation or digital transmission of video signals. Generally, a CNR of at least 40 dB is necessary to provide clear reception of AM-VSB television signals.

The replacement of coaxial cable with optical fiber transmission lines in television distribution systems has become a high priority. Production single mode fiber can support virtually unlimited bandwidth and has low attenuation. Accordingly, a fiber optic distribution system or a fiber-coax cable hybrid would provide substantially increased performance at a competitive cost as compared to prior art coaxial cable systems. In order to implement such systems, optical couplers are necessary to couple different optical signals to the distribution network or to components of the distribution network, such as optical amplifiers.

Amplification of optical signals within an optical fiber network has been a problem in the attempt to distribute AM-VSB television signals. As noted above, amplifiers are required between a cable system headend and a subscriber's home in order to provide signals to the subscriber at an acceptable power level. Semiconductor optical amplifiers of the type typically used in fiber optic systems produce high levels of distortion products that are not compatible with multi-channel AM-VSB video signals. This is due to the short lifetime of the carrier excited state within the semiconductor optical amplifier. The recombination time of such an amplifier operating near 1.3 $\mu$m or 1.5 $\mu$m is about 1.2 nanoseconds, which is short compared to the period of a typical AM-VSB subcarrier operating in the television band of about 55.25 MHz to 1 GHz.

Optical fiber amplifiers, such as erbium-doped fiber amplifiers, have been proposed for applications in long distance transmission and subscriber loop distribution systems. See, e.g., W. I. Way, et al, "Noise Figure of a Gain-Saturated Erbium-Doped Fiber Amplifier Pumped at 980 nm", *Optical Amplifiers and Their Applications*, 1990 Technical Digest Series, Vol. 13, Conference Edition, Optical Society of America, August 6-8, 1990, Paper TuB3, pp. 134-137, and C. R. Giles, "Propagation of Signal and Noise in Concatenated Erbium-Doped Fiber Optical Amplifiers", *Journal of Lightwave Technology*, Vol. 9, No. Feb. 2, 1991, pp. 147-154.

The noise figure of the fiber amplifier is a parameter that must be considered in such systems to optimize overall system performance. Noise figures of an erbium-doped fiber amplifier pumped at 980 nm have been found to be near 3 dB, which is a desirable performance figure. However, an erbium-doped fiber amplifier pumped at 980 nm does not exhibit an optimal power efficiency for a communication signal distributed at a typical wavelength of about 1550 nm.

In order to provide a higher power efficiency for a 1550 nm communication signal, erbium-doped fiber amplifiers can be pumped at about 1480 nm. However, pumping at this wavelength results in a noise figure of about 5 dB, which is less than optimal.

One way to increase the power efficiency of a rare earth fiber amplifier, such as an erbium fiber amplifier, is to increase the pump power to the doped fiber. High power pump lasers suitable for use with rare earth fiber amplifiers, and particularly erbium fiber amplifiers, have not been readily available at a low enough cost for wide scale use in cable television distribution systems. It would therefore be advantageous to provide a scheme for providing high power pumping energy at relatively low cost. It would be further advantageous to provide an improved technique for coupling pump energy to a fiber amplifier using a simple and inexpensive optical component, such as a grating.

Recent progress has been made in placing gratings in optical fibers by modifying the fiber index of refraction. Examples of processes for forming such gratings can be found in G. Meltz, W. W. Morey and W. H. Glenn, *Optical Letters*, Vol. 14, p. 823, 1989 and R. Kashgap, J. R. Armitage, R. Wyatt, S. T. Davey, and D. L. Williams, *Electronics Letters*. Vol. 26, p. 730, 1990. These articles describe the formation of gratings by photorefractive techniques. Fiber gratings can also be fabricated according to the teachings of C. M. Ragdale, et al, "Bragg Grating Add-Drop Optical Multiplexers for InP Based Optoelectronic Integrated Circuits," Integrated Photonics Research Conference, IEEE OSA Meeting, Apr. 9, 1991, Monterey, California, Paper TuD12.

The gratings disclosed in the articles cited above are perpendicular to the direction in which the optical signal propagates through the substrate containing the grating. When the grating is placed perpendicular to the direction of the lightwave propagation, the light is reflected back upon its original path. Thus, such gratings are used as reflectors.

In the field of optical communications, it is desirable to multiplex different optical signals onto a single optical fiber. The optical fiber can then distribute the various signals for selective retrieval at a receiver. It is also desirable to provide low cost, high power lasers for use in communicating signals via optical fibers. As an alternative or complement to a high power source laser, the provision of a high power optical fiber amplifier is desirable.

In order to achieve the above, it would be advantageous to provide a wavelength selective optical fiber coupler. It would be further advantageous to provide a high power optical fiber amplifier that can make effective use of a wavelength selective optical fiber coupler to provide a low cost solution for the amplification of optical signals in a communication network, such as a cable television distribution network. It would be still further advantageous to provide a wavelength selective optical coupler that can be used to multiplex a plurality of different optical information signals onto a common transmission path.

The present invention provides a wavelength selective optical coupler that enjoys the aforementioned advantages. A high power optical amplifier and an optical multiplexing scheme embodying the coupler are also provided.

SUMMARY OF THE INVENTION

In accordance with the present invention, a wavelength selective optical fiber coupler is provided. A first substrate has an optical input end for receiving a first optical signal. A first grating is formed in the first substrate. A second substrate has an optical input end for receiving a second optical signal. A second grating is formed in the second substrate. Means are provided for joining the first and second gratings to transfer energy from the second optical signal to the first optical substrate for combination with the first optical signal. The combined signals are output from an optical output end of the first substrate. In a preferred embodiment, the gratings are optimized to pass a specific wavelength of the second optical signal. In order to effect the energy transfer from the second optical signal to the first substrate, the gratings are formed from lines that are oriented at a nonperpendicular angle with respect to the direction of lightwave propagation through their respective substrates.

At least one of the substrates can comprise an optical fiber. For substrates that are optical fibers, the gratings are advantageously in-fiber gratings. In an illustrated embodiment, the optical fibers have a substantially D-shaped cross section with their respective gratings formed in a flat portion thereof. The joining means mate the flat portions to couple the evanescent fields of the two fibers.

In another illustrated embodiment, at least one of the substrates is a polished optical block. For example, one of the substrates can comprise a polished optical block with its grating situated on a flat surface thereof. The other of the substrates can comprise an optical fiber having an in-fiber grating situated in a flat portion of the cross section of the fiber. The joining means mate the flat portion of the optical fiber with the flat surface of the polished optical block such that the gratings adjoin each other.

Apparatus is also provided for combining a plurality of optical signals for communication via a common transmission path. Each of the optical signals is coupled to a corresponding grating. A collector fiber has a plurality of in-fiber gratings corresponding to the plurality of optical signals. Means are provided for joining the grating for each optical signal with a corresponding in-fiber grating of the collector fiber. An output end of the collector fiber is coupled to the common transmission path.

In a preferred embodiment, the grating for each optical signal and the corresponding in-fiber grating of the collector fiber are optimized as a pair to pass a specific wavelength of the optical signal. The gratings for the optical signals can be in-fiber gratings formed in flat portions of corresponding optical signal fibers. The in-fiber gratings of the collector fiber are situated in flat portions thereof. The joining means mate the flat portions of the optical signal fibers with corresponding flat portions of the collector fiber to transfer optical energy from the optical signals to the collector fiber. Again, the grating for each optical signal and the corresponding in-fiber grating of the collector fiber can be optimized as a pair to pass a specific wavelength of the optical signal.

In another embodiment, the gratings for the optical signals are formed in flat portions of corresponding polished optical blocks. The in-fiber gratings of the collector fiber are situated in flat portions thereof. The joining means mate the flat portions of the polished optical blocks with corresponding flat portions of the collector fiber to transfer optical energy from the optical signals to the collector fiber. Preferably, the grating for each optical signal and the corresponding in-fiber grating of the collector fiber will be optimized as a pair to pass a specific wavelength of the optical signal. The gratings can comprise lines that are oriented at a nonperpendicular angle with respect to the direction of lightwave propagation into the grating.

A high power optical fiber amplifier that makes use of pump power received from a collector fiber in accordance with the invention is also provided. The amplifier comprises an erbium/ytterbium doped optical fiber having an input region and an output region. Means are provided for inputting an optical signal to the input region of the erbium/ytterbium doped optical fiber for amplification. A neodymium fiber laser having an input end and an output end is provided to pump the erbium/ytterbium fiber. The output end of the neodymium fiber laser is coupled to the input region of the erbium/ytterbium doped fiber to effect the pumping. The neodymium fiber laser comprises an optical fiber having a first core that provides a multi-mode waveguide and an adjacent neodymium doped second core. A source of pump energy is coupled to the first core for pumping the neodymium fiber laser. In this manner, the first core couples the pumping energy from the pump source to the second core.

In a preferred embodiment, a plurality of neodymium fiber pump lasers are provided, operating at slightly different wavelengths within the pump band of the erbium/ytterbium fiber. Each of the neodymium fiber pump lasers is coupled to pump the erbium/ytterbium fiber. In particular, a collector fiber can be provided for coupling the neodymium fiber pump lasers to the erbium/ytterbium fiber. The collector fiber has a plurality of in-fiber gratings corresponding to the plurality of neodymium fiber pump lasers. An in-fiber grating is provided at the output end of each neodymium fiber pump laser. The in-fiber grating of each neodymium fiber pump laser is joined with a corresponding in-fiber grating of the collector fiber. Means are provided for coupling an output end of the collector fiber to the erbium/ytterbium fiber.

In a preferred embodiment, the in-fiber grating of each neodymium fiber pump laser and the corresponding in-fiber grating of the collector fiber are optimized to pass a specific wavelength output from the associated neodymium fiber pump laser. The in-fiber gratings can be formed in fiber portions having a substantially D-shaped cross section.

BRIEF DESCRIPTION OF THE DRAWINGS

FIG. 9 is a schematic diagram illustrating the use of the system of FIG. 7 to pump a high power fiber amplifier;

FIG. 10 is a diagrammatic illustration of a high power erbium/ytterbium optical fiber amplifier using a neodymium pump laser in accordance with the present invention; and FIG. 11 is a cross section of the neodymium fiber pump laser used in the optical fiber amplifier of FIG. 10.

DETAILED DESCRIPTION OF THE INVENTION

The present invention provides apparatus for coupling narrowband light into or out of single mode fibers. Multi-mode fiber can also be used in accordance with the present invention, although it will not operate as efficiently. In accordance with the present invention, light is coupled across an adjoining pair of gratings. The gratings are placed at an angle to the direction of lightwave propagation, such that light is reflected out of the guiding region of the optical fiber. The angle at which the grating lines are placed is chosen using Bragg's law to optimize the coupling of a specific wavelength of light. See, e.g., Halliday and Resnick, *Physics*, John Wiley & Sons, Inc., New York, New York, Part II, pp. 1140-1142 (1962) for an explanation of Bragg's law.

Figure 1:
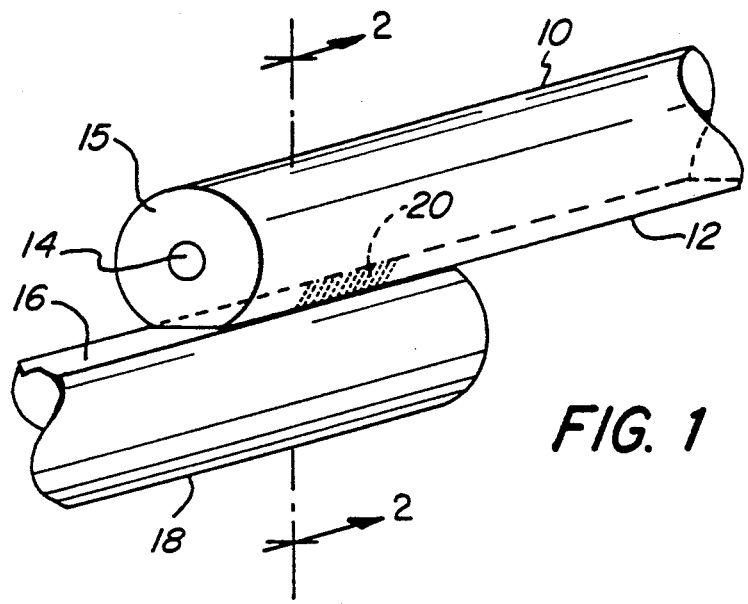
FIG. 1 is a diagrammatic illustration of two substantially D-shaped fibers having in-fiber gratings on their flat surfaces that are joined to couple light from one fiber to the other.
Figure 2:
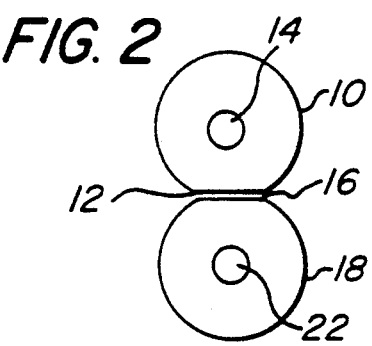
FIG. 2 is a cross section taken along the lines 2—2 of FIG. 1.
Figure 3:
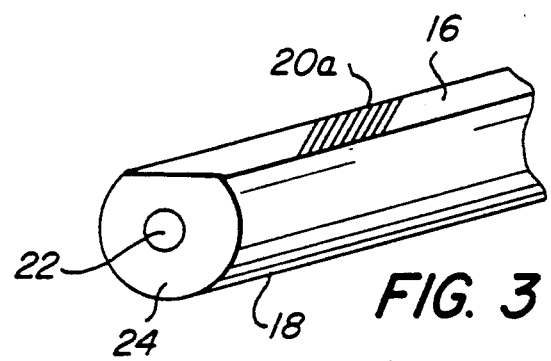
FIG. 3 is a diagrammatic illustration of one of the fibers of FIG. 1 showing the in-fiber grating in greater detail.

The gratings are preferably in-fiber gratings, that can be fabricated, for example, using a known photorefractive process. A fiber is prepared to receive the grating by removing a portion of its cladding material, down to the evanescent field of the fiber. This results in a fiber having a substantially D-shaped cross section, as illustrated in FIGS. 1-3. In particular, a fiber 10 has its cladding 15 removed to provide a flat surface 12 into which a grating can be formed. The fiber includes a core 14 as well known in the art. A second fiber 18 is provided with a flat surface 16 that also includes an in-fiber grating. The adjoining in-fiber gratings, designated 20 in FIG. 1, overlap to couple light from fiber 18 into fiber 10. Like fiber 10, fiber 18 includes a conventional core 22. The in-fiber grating 20a of fiber 18 is shown in greater detail in FIG. 3. A similar in-fiber grating is provided in fiber 10.

In the two fibers illustrated in FIG. 1, a wavelength selective coupling is achieved by matching the interaction length of the gratings 20 to the coupling length. In this manner, light is selectively coupled based on wavelength, from one fiber to the other. Specifically, the evanescent fields of the two fibers are coupled.

Coupling can be effected without removing very much of the cladding material. Since the function of the grating is to strongly enhance selective coupling of narrowband light, the coupler of the present invention actually deals with more than just the evanescent tail of the lightwave.

Figure 4:
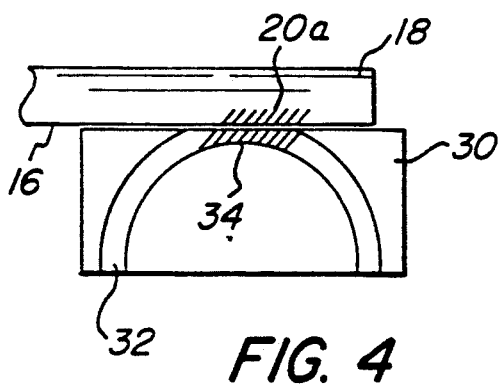
FIG. 4 is a diagrammatic illustration of a polished optical block having a grating that adjoins the grating provided in the flat surface of the fiber illustrated in FIG. 3.
Figure 5:
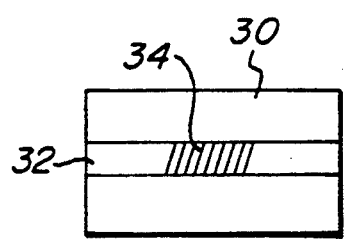
FIG. 5 is a top view of the polished optical block of FIG. 4, showing the grating contained therein.

In another embodiment, illustrated in FIGS. 4 and 5, a polished block coupler 30 is provided from a solid block of optical material. Such polished block material is available commercially, e.g., from Canadian Instruments of Burlington, Ontario, Canada. A waveguide 32 within the polished optical block 30 is provided with a grating 34. The lines of grating 34 are provided at an angle that is not perpendicular to the direction of wavelength propagation through the waveguide 32. In order to transfer energy from waveguide 32 into optical fiber 18, the flat portion 16 of fiber 18 is placed against the flat top of polished block 30 such that in-fiber grating 20a overlaps grating 34 of waveguide 32. Like grating 34, the lines of grating 20a are at an angle that is not perpendicular to the direction of lightwave propagation within fiber 18.

Figure 6:
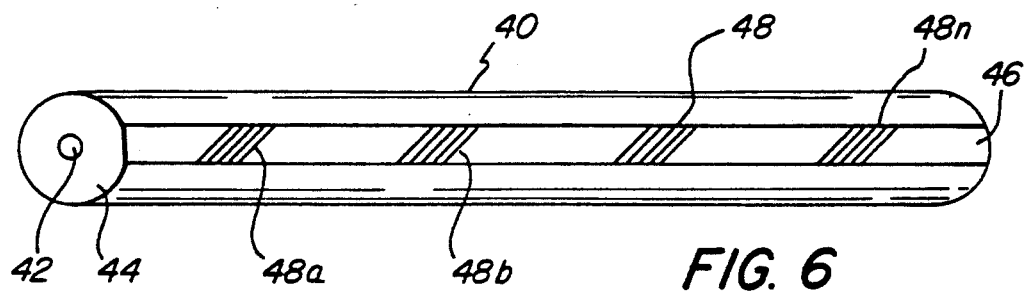
FIG. 6 is a diagrammatic illustration of a substantially D-shaped collector fiber containing a plurality of in-fiber gratings.

There are many applications for an optical coupler in accordance with the present invention. For example, wavelength division multiplexers and demultiplexers can be provided using a plurality of in-fiber gratings in a collector fiber 40 as illustrated in FIG. 6.

Collector fiber 40 is similar to fibers 10 and 18 illustrated in FIGS. 1-3. The cross section of the fiber is substantially D-shaped, and the fiber includes a conventional core 42 and cladding 44. In accordance with the present invention, a plurality of gratings 48a, 48b, 48c, . . . 48n are provided on the flat portion 46 of optical fiber 40. This enables a plurality of signal sources to be coupled into collector fiber 40 by aligning a corresponding grating from each signal source with one of the gratings 48a, 48b, 48c, . . . 48n of collector fiber 40. An example of this scheme is illustrated in FIG. 7.

Figure 7:
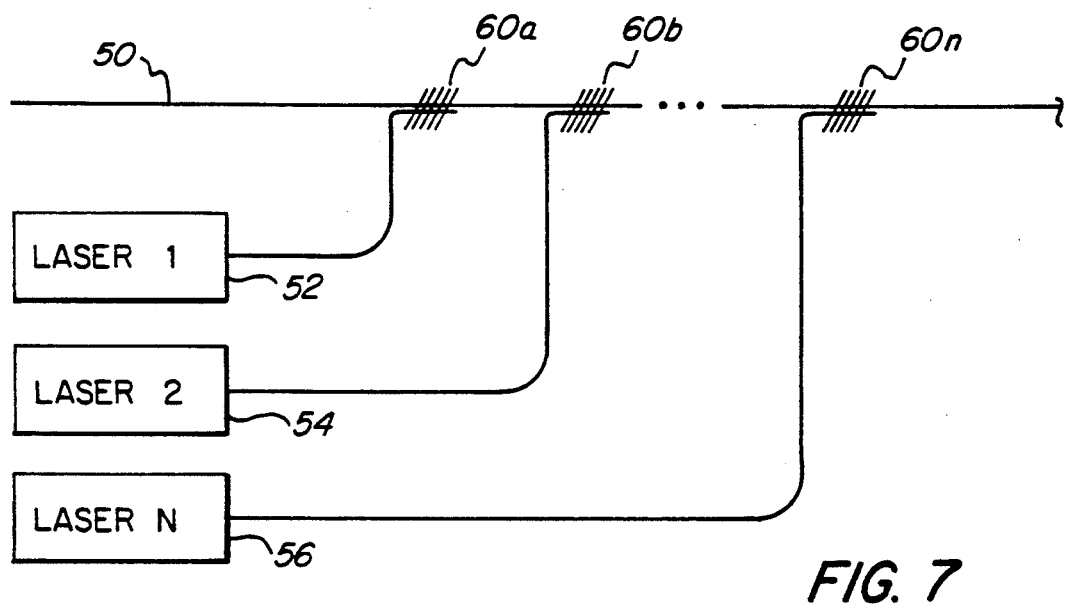
FIG. 7 is a schematic illustration illustrating the coupling of a plurality of lasers to a collector fiber via grating pairs that are optimized to pass a specific wavelength of the corresponding laser.
Figure 8:
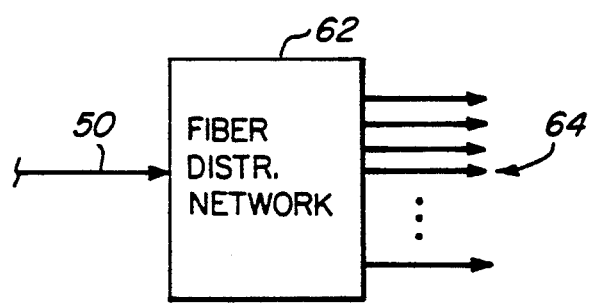
FIG. 8 is a block diagram illustrating the use of the arrangement of FIG. 7 in connection with an optical fiber communication signal distribution network.

In FIG. 7, collector fiber 50 combines the outputs of a plurality of lasers 52, 54, 56. In an embodiment illustrated in FIG. 8, collector fiber 50 is used to feed a fiber distribution network 62. In such an embodiment, each of lasers 52, 54, 56 can provide, for example, a modulated optical signal containing a plurality of video subcarriers. The video modulation from laser 52 is coupled to the collector fiber 50 via a pair of gratings 60a. Similarly, video modulation from laser 54 is coupled to collector fiber 50 via grating pair 60b. Video modulation from laser 56 is coupled to the collector fiber via grating pair 60n. The combined video modulation signals are input to a fiber distribution network 62 (FIG. 8) for distribution via a plurality of transmission paths 64.

In another embodiment, collector fiber 50 can be used to supply pump energy to an optical fiber amplifier 76 illustrated in FIG. 9. In this embodiment, each of lasers 52, 54, 56 (FIG. 7) provides pump energy at a slightly different wavelength. Each wavelength is selectively coupled to collector fiber 50 via the grating pairs 60a, 60b, and 60n. The combined pump signal is input to a wavelength division multiplexer 70, that also receives an input signal to be amplified via an optical isolator 72. The output of wavelength division multiplexer 70 is coupled to an optical fiber amplifier, such as an erbium fiber amplifier 76 via a conventional coupler 74. The amplified signal is coupled via coupler 78 to an optical isolator 80 and output for transmission. By providing the combined pump signals from collector fiber 50, amplification at high powers is achieved. Raman fiber amplifiers, Brillioun gain, and four wave mixing applications can also be accommodated in accordance with the present invention.

High power operation of the optical fiber amplifier of FIG. 9 is possible because the pump band of the rare earth material (e.g., erbium) is generally broad. For example, the 3 dB pump band of the 980 nm and 1480 nm wavelengths of erbium is about 20 nm. Thus, a plurality of pump lasers, such as pump lasers 52, 54, 56 can provide slightly different wavelengths over the 20 nm pump band. For example, eleven separate pump lasers can be provided, each operating at wavelengths that are 2 nanometers apart starting at 1460 nm and ending at 1480 nm. The grating pair 60a, 60b, . . . 60n associated with each laser will be optimized to pass the specific wavelength at which the laser operates.

Such a grating coupler offers a method for low loss coupling. Clearly, the pump laser multiplexing system must be designed so that the optical bandwidth of the pump laser is efficiently matched to the acceptance bandwidth of the grating coupler. The grating can be made short and chirped to accommodate pump lasers with a broad spectral pattern. Some pump lasers have a broad optical spectrum, while others have a narrow optical spectrum. The wavelength selective coupling technique of the present invention is particularly advantageous for use with 807 nm pump wavelengths where inexpensive low power lasers are available. By using a plurality of low cost lasers in conjunction with a collection fiber as illustrated in FIG. 7, an overall high pump power can be achieved.

An example of a low cost 807 nm laser structure is illustrated in FIGS. 10 and 11. It is known that an erbium fiber which is co-doped with ytterbium can be pumped at 1.06 $\mu$m, which is the preferred transition in neodymium. Although the pumping efficiency of the erbium/ytterbium fiber is not as good as pumping straight erbium at either 980 nm or 1480 nm, much higher pump powers are available at 1.06 $\mu$m, offsetting this disadvantage. In the structure illustrated in FIG. 10, a neodymium fiber laser operating at 1.06 $\mu$m is used to pump an erbium/ytterbium fiber.

A neodymium fiber laser for use in pumping an erbium/ytterbium fiber can be constructed from a neodymium doped fiber having a cross section as illustrated in FIG. 11. Fiber 120 includes an inner core 94 and an outer core 96. The inner core 94 is doped with $Nd^{3+}$. The outer core 96 has a substantially rectangular cross section, and provides a multi-mode waveguide for propagation of the pump energy, which in the present case is 807 nm. The fact that $Nd^{3+}$ provides a four-level laser system allows pump energy input to the outer core 96 (e.g., at 807 nm) to pump the neodymium doped inner core 94, thereby providing a 1.06 $\mu$m laser output. The inner and outer cores are surrounded by cladding 98 in a conventional manner.

Pumping of the laser is provided by a high power laser array 92 illustrated in FIG. 10. The broad area of the outer core 96 allows a high power laser array, such as a GaAs array, to efficiently couple thereto. Laser arrays of the type described are commercially available, for example from Spectra Diode Laboratories of San Jose, California.

Laser array 92 illustrated in FIG. 10 outputs light having an 807 nm wavelength. This light pumps the neodymium laser, generally designated 90, via a first reflector 112 that passes the 807 nm light into outer core 96 of fiber 120. For the best laser operation, reflector 112 should exhibit high reflectivity at 1.06 $\mu$m (the lasing wavelength) and high transmission at 807 nm (the pump wavelength). A second reflector 114 is optimized based on the neodymium fiber laser design. Generally, reflector 114 will reflect on the order of ten percent of the 1.06 $\mu$m lasing energy and pass the balance, to couple the majority of the 1.06 $\mu$m light into erbium/ytterbium fiber amplifier 106.

Reflector 112 can be fabricated from a photorefractive grating that is designed to have high reflectivity at 1.06 $\mu$m and high transmissivity at 807 nm. Reflector 114 can be fabricated in the same manner, as a wide grating that reflects the pump wavelength of 807 nm to provide more efficient operation of the pump. An additional reflector (not shown) can be provided adjacent to reflector 114 to reflect any unabsorbed pump power, enabling the length of the neodymium fiber to be shortened.

The 1.06 $\mu$m output of laser 90 is multiplexed in a wavelength division multiplexer 100 with an input signal to be amplified. The input signal is passed through a conventional optical isolator 102 prior to wavelength division multiplexer 100. The multiplexed signal is output to erbium/ytterbium fiber amplifier 106 via a conventional optical coupler 104. A coupler 108 couples the amplified signal to an optical isolator 110 for output.

Laser 90 can be used to provide multiple pumps for the erbium/ytterbium fiber amplifier 106 when used in combination with a collector fiber such as fiber 50 discussed above in connection with FIG. 7. If it is desired to use multiple fiber laser pumps, reflector 112 in each of a plurality of different pump lasers 90 is made to match the wavelength of the particular grating pair 60a, 60b, . . . 60n (FIG. 7) used to couple the laser output to the collector fiber 50. Since the pump band of the erbium/ytterbium fiber amplifier 106 is very broad, starting below 1.0 $\mu$m and continuing to above 1.2 $\mu$m, a substantial number of pump lasers, each operating at a slightly different wavelength, can be used to pump the amplifier for high power.

It should now be appreciated that the present invention provides a wavelength selective optical fiber coupler having a variety of applications. In one application, the coupler is used to combine a plurality of optical signals for communication via a common transmission path. In another application, the coupler is used to provide a plurality of pump wavelengths within the broad pump band of an optical fiber amplifier. Such a structure provides a high power optical amplifier. The cost of such a high power optical amplifier can be minimized by using a plurality of low cost dual core neodymium fiber pump lasers as illustrated in FIGS. 10 and 11.

Although the invention has been described in connection with several specific embodiments, those skilled in the art will appreciate that various adaptations and modifications may be made thereto without departing from the spirit and scope of the invention, as set forth in the claims.

What is claimed is:

1. A wavelength selective optical fiber coupler comprising:
    a first substrate having an optical input end for receiving a first optical signal;
    a first grating formed in said first substrate;
    a second substrate having an optical input end for receiving a second optical signal;

a second grating formed in said second substrate; and means for joining said first and second gratings to transfer energy from said second optical signal to said first substrate for combination with said first optical signal to form a combined signal for output from an optical output end of said first substrate.

2. A wavelength selective optical coupler in accordance with claim 1 wherein said gratings are optimized to pass a specific wavelength of said second optical signal.

3. A wavelength selective optical coupler in accordance with claim 1 wherein said gratings comprise lines that are oriented at a nonperpendicular angle with respect to the direction of lightwave propagation through their respective substrates.

4. A wavelength selective optical coupler in accordance with claim 1 wherein at least one of said substrates is an optical fiber.

5. A wavelength selective optical coupler in accordance with claim 1 wherein said substrates are optical fibers and said gratings are in-fiber gratings.

6. A wavelength selective optical coupler in accordance with claim 5 wherein:

said optical fibers have a substantially D-shaped cross section with their respective gratings formed in a flat portion thereof; and said joining means mate said flat portions to couple the evanescent fields of the two fibers.

7. A wavelength selective optical coupler in accordance with claim 1 wherein at least one of said substrates is a polished optical block.

8. A wavelength selective optical coupler in accordance with claim 1 wherein:

one of said substrates is a polished optical block with its grating situated on a flat surface thereof;

the other of said substrates is an optical fiber having an in-fiber grating situated in a flat portion of the cross section of the fiber; and said joining means mate the flat portion of the optical fiber with the flat surface of said polished optical block such that the gratings adjoin each other.

9. Apparatus for combining a plurality of optical signals for communication via a common transmission path comprising:

means for coupling each of said optical signals to a corresponding grating;

a collector fiber having a plurality of in-fiber gratings corresponding to said plurality of optical signals;

means for joining the grating for each optical signal with a corresponding in-fiber grating of said collector fiber; and means for coupling an output end of said collector fiber to said transmission path.

10. Apparatus in accordance with claim 9 wherein the grating for each optical signal and the corresponding in-fiber grating of said collector fiber are optimized as a pair to pass a specific wavelength of the optical signal.

11. Apparatus in accordance with claim 9 wherein:

the gratings for said optical signals are in-fiber gratings formed in flat portions of corresponding optical signal fibers;

the in-fiber gratings of the collector fiber are situated in flat portions thereof; and said joining means mate the flat portions of said optical signal fibers with corresponding flat portions of the collector fiber to transfer optical energy from the optical signals to said collector fiber.

12. Apparatus in accordance with claim 11 wherein the grating for each optical signal and the corresponding in-fiber grating of said collector fiber are optimized as a pair to pass a specific wavelength of the optical signal.

13. Apparatus in accordance with claim 9 wherein:

the gratings for said optical signals are formed in flat portions of corresponding polished optical blocks;

the in-fiber gratings of the collector fiber are situated in flat portions thereof; and said joining means mate the flat portions of said polished optical blocks with corresponding flat portions of the collector fiber to transfer optical energy from the optical signals to said collector fiber.

14. Apparatus in accordance with claim 13 wherein the grating for each optical signal and the corresponding in-fiber grating of said collector fiber are optimized as a pair to pass a specific wavelength of the optical signal.

15. Apparatus in accordance with claim 9 wherein said gratings comprise lines that are oriented at a nonperpendicular angle with respect to the direction of lightwave propagation into the grating.

16. A high power optical fiber amplifier comprising:

an erbium and ytterbium codoped optical fiber having an input region and an output region;

means for inputting an optical signal to the input region of said codoped optical fiber for amplification; and a neodymium fiber laser having an input end and an output end, said output end coupled to the input region of said codoped optical fiber for end pumping said codoped fiber, said neodymium fiber laser comprising:

an optical fiber having a first core that provides a multimode waveguide and an adjacent neodymium doped second core; and a source of pump energy coupled to said first core for pumping said neodymium fiber laser;

wherein said first core couples the pumping energy from said source to said second core.

17. An optical fiber amplifier in accordance with claim 16 comprising:

a plurality of neodymium fiber pump lasers operating at slightly different wavelengths within the pump band of the codoped fiber; and means for coupling each of said neodymium fiber pump lasers to pump said codoped fiber.

18. An optical fiber amplifier in accordance with claim 17 wherein said coupling means comprise:

a collector fiber having a plurality of in-fiber gratings corresponding to said plurality of neodymium fiber pump lasers;

an in-fiber grating in the output end of each neodymium fiber pump laser;

means for joining the in-fiber grating of each neodymium fiber pump laser with a corresponding in-fiber grating of said collector fiber; and means for coupling an output end of said collector fiber to said codoped fiber.

19. An optical fiber amplifier in accordance with claim 18 wherein said in-fiber grating of each neodymium fiber pump laser and the corresponding in-fiber grating of said collector fiber are optimized to pass a specific wavelength output from the associated neodymium fiber pump laser.

20. An optical fiber amplifier in accordance with claim 18 wherein said in-fiber gratings are formed in fiber portions having a substantially D-shaped cross section.

* * * * *